US011638317B2

(12) United States Patent
Hirano et al.

(10) Patent No.: US 11,638,317 B2
(45) Date of Patent: Apr. 25, 2023

(54) ELECTRONIC APPARATUS AND METHOD

(71) Applicant: KABUSHIKI KAISHA TOSHIBA, Tokyo (JP)

(72) Inventors: Tatsuma Hirano, Kawasaki Kanagawa (JP); Toshio Ariga, Kawasaki Kanagawa (JP); Masahiro Sekiya, Inagi Tokyo (JP); Toshihisa Nabetani, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 17 days.

(21) Appl. No.: 17/008,749

(22) Filed: Sep. 1, 2020

(65) Prior Publication Data
US 2021/0127441 A1 Apr. 29, 2021

(30) Foreign Application Priority Data
Oct. 23, 2019 (JP) .............. JP2019-192851

(51) Int. Cl.
*H04W 76/15* (2018.01)
*H04W 28/04* (2009.01)
*H04W 84/12* (2009.01)

(52) U.S. Cl.
CPC ........... *H04W 76/15* (2018.02); *H04W 28/04* (2013.01); *H04W 84/12* (2013.01)

(58) Field of Classification Search
CPC ..... H04W 76/19; H04W 40/02; H04W 84/12; H04W 28/04; H04W 76/15
See application file for complete search history.

(56) References Cited

U.S. PATENT DOCUMENTS 11,201,697 B2 * 12/2021 Tanaka .................. H04W 74/06
2004/0165543 A1 8/2004 Nakazawa
(Continued)

FOREIGN PATENT DOCUMENTS

JP 2004253934 A 9/2004
JP 2007531340 A 11/2007
(Continued)

OTHER PUBLICATIONS

U.S. Appl. No. 16/804,780; First Named Inventor: Toshihisa Nabetani; Title: "Wireless Communication Apparatus", filed Feb. 28, 2020.
(Continued)

*Primary Examiner* — Syed Ali
(74) *Attorney, Agent, or Firm* — Holtz, Holtz & Volek PC

(57) ABSTRACT

According to one embodiment, an electronic apparatus includes a transmitter. The transmitter transmits data to be transmitted to a third wireless communication apparatus and a first wireless signal to instruct transmission of the data to the third wireless communication apparatus, to the first and second wireless communication apparatuses. The transmitter transmits, if any second wireless signal transmitted from the first or second wireless communication apparatuses is not detected within a first period after transmission of the first wireless signal, a third wireless signal to instruct transmission of the data to the third wireless communication apparatus to the first and second wireless communication apparatuses in order to instruct retransmission of the data.

20 Claims, 9 Drawing Sheets

(56) References Cited

U.S. PATENT DOCUMENTS

| | | | |
|---|---|---|---|
| 2005/0169480 A1* | 8/2005 | Kuehn | H04L 63/06 380/277 |
| 2005/0190709 A1* | 9/2005 | Ferchland | H04W 52/0287 370/311 |
| 2006/0233200 A1 | 10/2006 | Fifield et al. | |
| 2008/0222478 A1 | 9/2008 | Tamaki | |
| 2009/0262678 A1 | 10/2009 | Oyman et al. | |
| 2012/0087265 A1 | 4/2012 | Tamaki et al. | |
| 2017/0196010 A1* | 7/2017 | Matsuo | H04W 72/0453 |
| 2017/0257902 A1* | 9/2017 | Xing | H04L 1/1887 |
| 2019/0007161 A1* | 1/2019 | Xing | H04W 74/0808 |
| 2020/0077441 A1 | 3/2020 | Madhavan et al. | |
| 2020/0119863 A1 | 4/2020 | Nakanishi et al. | |
| 2021/0105583 A1* | 4/2021 | Xing | H04L 1/1621 |
| 2021/0144766 A1* | 5/2021 | Kim | H04W 74/0816 |
| 2021/0195460 A1* | 6/2021 | Park | H04W 28/0268 |

FOREIGN PATENT DOCUMENTS

| | | |
|---|---|---|
| JP | 2008227642 A | 9/2008 |
| JP | 2009278557 A | 11/2009 |
| JP | 2011514109 A | 4/2011 |
| JP | 5406919 B2 | 2/2014 |
| JP | 2017123550 A | 7/2017 |

OTHER PUBLICATIONS

U.S. Appl. No. 17/014,616; First Named Inventor: Masahiro Sekiya; Title: "Wireless Communication Apparatus", filed Sep. 8, 2020.

* cited by examiner

ELECTRONIC APPARATUS AND METHOD

CROSS-REFERENCE TO RELATED APPLICATIONS

This application is based upon and claims the benefit of priority from Japanese Patent Application No. 2019-192851, filed Oct. 23, 2019, the entire contents of which are incorporated herein by reference.

FIELD

Embodiments described herein relate generally to an electronic apparatus and a method.

BACKGROUND

In recent years, there is a known technique of improving the reliability of wireless communication using multiple wireless communication apparatuses working in cooperation (coordinated transmission techniques).

In such a coordinated transmission technology, it is necessary to establish a procedure for smooth wireless communication.

DETAILED DESCRIPTION

In general, according to one embodiment, an electronic apparatus which is communicable with a first wireless communication apparatus and a second wireless communication apparatus is provided. The electronic apparatus includes a transmitter. The transmitter is configured to transmit (1) data to be transmitted to a third wireless communication apparatus different from the first and (2) second wireless communication apparatuses and a first wireless signal to instruct transmission of the data to the third wireless communication apparatus, to the first and second wireless communication apparatuses. The transmitter is further configured to transmit, if any second wireless signal transmitted from the first or second wireless communication apparatuses is not detected within a first period after transmission of the first wireless signal, a third wireless signal to instruct transmission of the data to the third wireless communication apparatus to the first and second wireless communication apparatuses in order to instruct retransmission of the data.

Various embodiments will be described hereinafter with reference to the accompanying drawings.

First Embodiment

Figure 1:
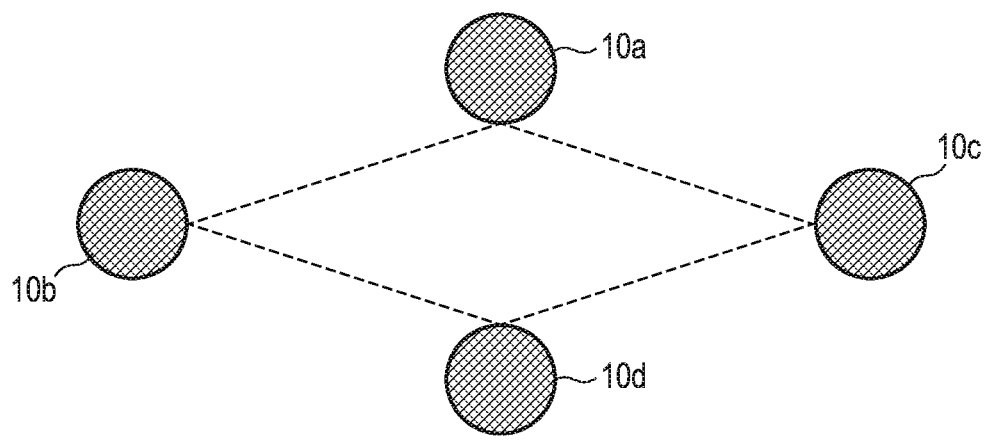
FIG. 1 illustrates a diagram of an example of a structure of a network system including a wireless communication apparatus of a first embodiment.

FIG. 1 shows a network system (network topology) including a wireless communication apparatus (electronic apparatus) of a first embodiment. As shown in FIG. 1, the network system includes wireless communication apparatuses 10a to 10d.

In that case, the wireless communication apparatus 10a is communicatively connected to the wireless communication apparatuses 10b and 10c via an established network. The wireless communication apparatus 10d is communicatively connected to the wireless communication apparatuses 10b and 10c via the established network.

In this embodiment, a cooperative transmission technique is applied to such a network system, and it is assumed that data are transmitted from the wireless communication apparatus 10a to the wireless communication apparatus 10d. According to the cooperative transmission technique, for example, a plurality of wireless communication apparatuses 10b and 10c can cooperate (coordinate) in the operation, and data from the wireless communication apparatus 10a can be transmitted over multiple paths to the wireless communication apparatus 10d, and thus the reliability of the wireless communication can be improved.

In the following explanation, the wireless communication apparatuses 10a to 10d shown in FIG. 1 above will be used to explain. However, the wireless communication apparatuses 10a to 10d may be a wireless base station (AP: Access Point), wireless terminals, etc. Specifically, for example, the wireless communication apparatuses 10a to 10c may be each a wireless base station and the wireless communication apparatus 10d may be a wireless terminal. In a case of such a network system, when the wireless base station corresponding to the wireless communication apparatus 10a may send data to a wireless terminal corresponding to the wireless communication apparatus 10d, two wireless base stations corresponding to wireless communication apparatuses 10b and 10d will operate in a coordinated manner.

Figure 2:
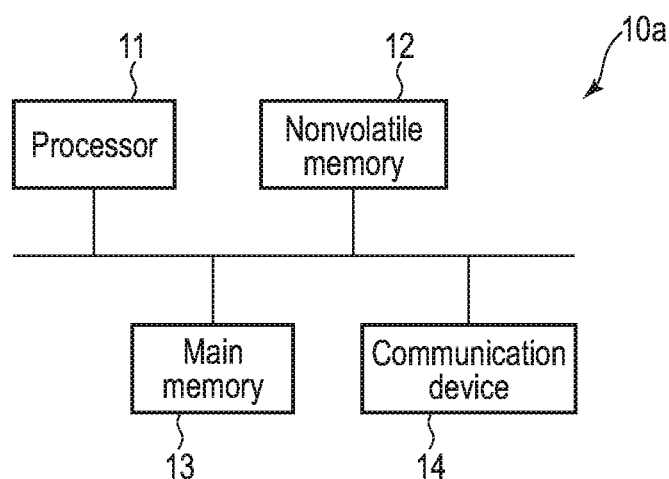
FIG. 2 illustrates an example of a hardware structure of a wireless communication apparatus.

The structure of the wireless communication apparatuses 10a to 10d will be described below. First, FIG. 2 shows an example of the hardware structure of the wireless communication apparatus 10a. As shown in FIG. 2, the wireless communication apparatus 10a includes, for example, a processor 11, a non-volatile memory 12, a main memory 13 and communication device 14.

The processor 11 is a hardware controlling the operation of each component of the wireless communication apparatus 10a. The processor 11 executes program to be loaded from the non-volatile memory 12 to the main memory 13.

The communication device 14 is designed to perform wireless communication with other wireless communication apparatuses 10b and 10c, for example.

In a case where the wireless communication apparatus 10a is a wireless base station, as described above, instead of a processor, a controller or other device may be provided to control the operation of AP.

FIG. 2 shows a hardware structure of the wireless communication apparatus 10a, and other wireless communication apparatuses 10b to 10c are the same as that of the wireless communication apparatus 10a.

Figure 3:
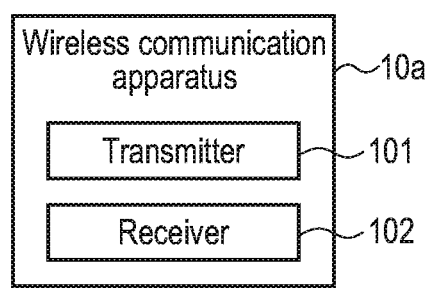
FIG. 3 illustrates a block diagram of an example of a functional structure of a wireless communication apparatus.

Next, FIG. 3 is a block diagram illustrating an example of the functional structure of the wireless communication apparatus 10a. As shown in FIG. 3, the wireless communication apparatus 10a includes a transmitter 101 and a receiver 102.

In this embodiment, some or all of the transmitter 101 and receiver 102 may be realized by executing program by the processor 11, that is, by software, or may be realized a specific hardware, or may be realized by a combination of software and hardware.

The transmitter 101 transmits various frames (wireless signals) to the wireless communication apparatuses 10b and 10c. The frame transmitted by the transmitter 101 includes, for example, a frame including data to be transmitted from the wireless communication apparatus 10a to the wireless communication apparatus 10d and a frame to instruct that the data are transmitted to the wireless communication apparatus 10d (i.e., coordinated transmission).

Furthermore, the receiver 102 receives (detects) various frames (wireless signal) transmitted from each of the wireless communication apparatuses 10b and 10c. In the frame received by the receiver 102, a frame including a result of receiving data in the wireless communication apparatus 10d may be included.

FIG. 3 shows a functional structure of the wireless communication apparatus 10a, and the functions of the other wireless communication apparatuses 10b to 10d are the same as the wireless communication apparatus 10a since a function part corresponding to the transmitter 101 and the receiver 102 is included therein.

Hereinafter, referring to a timing chart (message sequence chart) in FIG. 4, an example of the operation of a network system (wireless communication apparatuses 10a to 10d) of the present embodiment will be explained.

In this example, the coordinated transmission technique is applied as described above, and certain data (hereinafter referred to as target data) are transmitted from the wireless communication apparatus 10a to the wireless communication apparatus 10d. The target data transmitted from the wireless communication apparatus 10a to the wireless communication apparatus 10d includes the first data (hereinafter referred to as Data1) and the second data (Data2).

First, the wireless communication apparatus 10a transmits a first trigger frame (ax Trigger) indicating that the target data are data to be used for coordinated transmission, and a data frame containing the target data (data frame in which a frame containing first data and a frame containing second data are contiguous) to the wireless communication apparatuses 10b and 10c (step S1). In this case, the first trigger frame and the data frame are transmitted continuously.

Next, the wireless communication apparatuses 10b and 10c receive the first trigger frame and data frame transmitted from the wireless communication apparatus 10a in step S1. Thus, the wireless communication apparatuses 10b and 10c can recognize that the target data included in the data frame are data used in the cooperative transmission based on the first trigger frame.

As described above, when the first trigger frame and data frame are received in the wireless communication apparatuses 10b and 10c, the wireless communication apparatuses 10b and 10c transmits a BA (Block Ack) frame indicative of the reception of the data frame to the wireless communication apparatus 10a (step (S2)).

Note that the BA frame from the wireless communication apparatus 10b to the wireless communication apparatus 10a, and the BA frame from wireless communication apparatus 10c to wireless communication apparatus 10a are transmitted on wireless signals that are orthogonal to each other. As above, with the wireless communication apparatuses 10b and 10c each transmitting the BA frames using the same frequency in a mutually orthogonal form, collision of the BA frames can be avoided. In terms of avoiding BA frame collisions, the wireless communication apparatuses 10b and 10c may transmit the BA frames using different frequencies, respectively.

The BA frames transmitted from the wireless communication apparatuses 10b and 10c in step S2 will be received by the wireless communication apparatus 10a. Thus, the wireless communication apparatus 10a recognizes that the target data are received by the wireless communication apparatuses 10b and 10c, and transmits the second trigger frame (Coord Trigger) instructing the start of the coordinated transmission to the wireless communication apparatuses 10b and 10c (step S3). The second trigger frame (the first wireless signal) transmitted in step S3 includes a setting that data to be subjected to the cooperative transmission are the target data (first and second data), and for example, a transmission rate of the target data and a transmission time calculated from the data length of the target data may further be set.

When the target data is cooperatively transmitted, the target data may be necessarily retransmitted according to the communication environment in the vicinity. The retransmission may be instructed on the initiative of the wireless communication apparatus 10a, or it may be performed on the initiative of the wireless communication apparatuses 10b and 10c. In this embodiment, a case were the retransmission of the target data is instructed on the initiative of the wireless communication apparatus 10a will be explained, and in that case, the second trigger frame described above may include indication of a retransmission method (first retransmission method) indicating that the retransmission of the data is initiated by the wireless communication apparatus 10a.

The second trigger frame sent from the wireless communication apparatus 10a in step S3 will be received by the wireless communication apparatuses at 10b and 10c. The wireless communication apparatuses 10b and 10c receive the second trigger frame, thereby allowing the above data frames (i.e., target data including the first and second data) to be transmitted to the wireless communication apparatus 10d (step S4).

Note that the data frame from the wireless communication apparatus 10b to the wireless communication apparatus 10d, and data frame from wireless communication apparatus 10c to wireless communication apparatus 10d are transmitted in orthogonal wireless signals. As above, with the wireless communication apparatuses 10b and 10c transmitting data frames (wireless signal) using the same frequency in mutually orthogonal form, the collision between the data frames can be avoided. In terms of avoiding data frame collisions, the wireless communication apparatuses 10b and 10c may transmit the data frames using different frequencies, respectively.

In this embodiment, the wireless communication apparatus 10d can receive the data frames separately, which are transmitted from the wireless communication apparatuses 10b and 10c in step S4 by, for example, using multiple antennas. In that case, when the process of step S4 is executed, the wireless communication apparatus 10*d* receives the data frame from the wireless communication apparatus 10*b* and the data frame from the wireless communication apparatus 10*c*, and the wireless communication apparatus 10*d* transmits a Multi User Block Ack (MUBA) frame including a reception result of the target data (first and second data) in the wireless communication apparatus 10*d* to the wireless communication apparatuses 10*b* and 10*c* (step S5).

Note that, the MUBA frame includes a reception result indicative of whether or not the target data (first and second data) from the wireless communication apparatus 10*b* are received (hereinafter referred to as reception result for the wireless communication apparatus 10*b*), and a reception result indicative of whether or not the target data (first and second data) are received from the wireless communication apparatus 10*c* (hereinafter referred to as reception result for the wireless communication apparatus 10*c*).

Here, in the data frame sent in step S4 above, as described above, the frame containing the first data and the frame containing the second data are contiguous, but depending on the communication environment around the wireless communication apparatus 10*d*, only one of the first data (frame including the same) and the second data (frame including the same) may be received by the wireless communication apparatus 10*d*. Hereinafter, the explanation will be given assuming that only the second data may be received at wireless communication apparatus 10*d* from both wireless communication apparatuses 10*b* and 10*c*. In this case, in step S5, the MUBA frame including the reception result indicating that the second data are received from the wireless communication apparatus 10*b* and the reception result indicating that the second data are received from the wireless communication apparatus 10*c* are sent from the wireless communication apparatus 10*d* to the wireless communication apparatuses 10*b* and 10*c*.

Note that the reception results for each of the wireless communication apparatuses 10*b* and 10*c* included in the MUBA frame may be different. That is, for example, if the first and second data are received from the wireless communication apparatus 10*b* and the second data are received from the wireless communication apparatus 10*c*, the MUBA frame including the reception result indicating that the first and second data are received from the wireless communication apparatus 10*b* (reception result for wireless communication apparatus 10*b*) and the reception result indicating that the second data are received from the wireless communication apparatus 10*c* (reception result for the wireless communication apparatus 10*c*) will be sent to the wireless communication apparatuses 10*d* and 10*c*.

When the process of step S5 is executed, the wireless communication apparatuses 10*b* and 10*c* receive the MUBA frame sent from the wireless communication apparatus 10*d* in step S5. In that case, the wireless communication apparatuses 10*b* and 10*c*, based on the received MUBA frames, transmit the BA frame (second wireless signal) to the wireless communication apparatus 10*a* (step S6).

The process of step S6 will be specifically described now. The wireless communication apparatus 10*b* that received the MUBA frame retrieves the reception result for the wireless communication apparatus 10*b* from the MUBA frame, and transmits the BA frame containing the reception result to the wireless communication apparatus 10*a*.

Similarly, the wireless communication apparatus 10*c* that received the MUBA frame retrieves the reception result for the wireless communication apparatus 10*c* from the MUBA frame, and transmit the BA frame containing the reception result to the wireless communication apparatus 10*a*.

In other words, the BA frames transmitted from the wireless communication apparatuses 10*b* and 10*c* in step S6 are, in that they contain a single reception result for each of the wireless communication apparatuses 10*b* and 10*c*, different from the MUBA frames sent from the wireless communication apparatus 10*d* in step S5.

The BA frame from the wireless communication apparatus 10*b* to the wireless communication apparatus 10*a* and the BA frame from the wireless communication apparatus 10*c* to the wireless communication apparatus 10*a* in step S6 are transmitted in wireless signals that are orthogonal to each other.

Note that in step S6, the wireless communication apparatuses 10*b* and 10*c* may transmit, instead of the above mentioned BA frames, the MUBA frames received from the wireless communication apparatus 10*d* to the wireless communication apparatus 10*a*.

In addition, if BA frames are not sent from wireless communication apparatuses 10*b* and 10*c* to wireless communication apparatus 10*a*, the wireless communication apparatus 10*a* may be structured to transmit a Block Ack Request (BAR) frame to the wireless communication apparatuses 10*b* and 10*c* in order to request the BA frame. In that case, the processing of step S6 may be performed when the BAR frame transmitted from the wireless communication apparatus 10*a* is received in the communication apparatuses 10*b* and 10*c*.

In step S6, the BA frames transmitted from the wireless communication apparatuses 10*b* and 10*c* in step S6 will be received in the wireless communication apparatus 10*a*.

Here, it is assumed that only the second data is received in the wireless communication apparatus 10*d* as described above. In this case, the wireless communication apparatus 10*a* recognizes that the second data were received in the wireless communication apparatus 10*d* (that is, delivery of the second data is acknowledged) from the reception result included in the BA frame received from each of the wireless communication apparatuses 10*b* and 10*c*, as well as recognizing that the first data are not received in the wireless communication apparatus 10*d* (that is, delivery of the first data is not acknowledged).

Note that the wireless communication apparatus 10*a* will recognize the reception result from the wireless communication apparatus 10*d* in consideration of both the reception results contained in the BA frame received from the wireless communication apparatuses 10*b* and 10*c*. For example, if the reception result included in the BA frame received from the wireless communication apparatus 10*b* indicates that the first data are received and the reception result included in the BA frame received from the wireless communication apparatus 10*c* indicate that the second data are received, the wireless communication apparatus 10*a* recognizes that the wireless communication apparatus 10*d* has received all of the target data (first and second data).

If only the second data is received in the wireless communication apparatus 10*d* as described above, the wireless communication apparatus 10*a* retransmits the second trigger frame to the wireless communication apparatuses 10*b* and 10*c* in order to instruct the retransmission of the target data (the first data in this example) (step S7). In the second trigger frame transmitted in this step S7, it is set that the data to be transmitted in cooperative are the first data. Thus, in the present embodiment, the wireless communication apparatus 10*a* mainly instructs the retransmission of the target data. Note that, if the second data are not received by the wireless communication apparatus 10d, a second trigger frame in which the data to be transmitted in cooperation are the second data should be transmitted. Note that, the second trigger frame (third wireless signal) to instruct the transmission of the target data to the wireless communication apparatus 10d includes a part or the all of the second trigger frame transmitted from the wireless communication apparatus 10a in step S3.

In step S7, the second trigger frame sent from the wireless communication apparatus 10a will be received by the wireless communication apparatuses 10b and 10c. The wireless communication apparatuses 10b and 10c receive the second trigger frame, and thereby transmitting the data frame containing the first data to the wireless communication apparatus 10d (step S8).

Note that the data frame from the wireless communication apparatus 10b to the wireless communication apparatus 10d and data frames from wireless communication apparatus 10c to wireless communication apparatus 10d in step S8 are wireless signals orthogonal to each other.

When the process of step S8 is executed, the wireless communication apparatus 10d receives the data frame from the wireless communication apparatuses 10b and 10c (first data) and transmits the MUBA frame to the wireless communication apparatuses 10b and 10c (step S9). In the wireless communication apparatus 10d, for example, if the first data (data frame including the same) are received from both the wireless communication apparatuses 10b and 10c successfully, the MUBA frame transmitted in step S9 includes a reception result indicative of the reception of the first data from the wireless communication apparatus 10b (reception result for the wireless communication apparatus 10b) and a reception result indicative of the reception of the first data from the wireless communication apparatus 10c (reception result for the wireless communication apparatus 10c).

Next, the wireless communication apparatuses 10b and 10c receive the MUBA frame transmitted form the wireless communication apparatus 10d in step S9. In this case, the wireless communication apparatuses 10b and 10c can recognize that the first data are received in the wireless communication apparatus 10d (that is, delivery of the first data is acknowledged) based on the reception results for the wireless communication apparatuses 10b and 10c included in the received MUBA frames. In this case, all of the target data (first and second data) used for the coordinated transmissions are received by the wireless communication apparatus 10d, and thus, the wireless communication apparatuses 10b and 10c transmit an Ack frame indicative of the process completion to the wireless communication apparatus 10a (step S10).

The Ack frame from the wireless communication apparatus 10b to the wireless communication apparatus 10a and the Ack frame from the wireless communication apparatus 10c to the wireless communication apparatus 10a in the step S10 are wireless signals that are orthogonal to each other.

In step S10, the Ack frame is transmitted; however, the wireless communication apparatuses 10b and 10c may transmit BA frames, for example, as in step S6, or may transmit the MUBA frames received from the communication apparatus 10d.

When the process of step S10 is executed, the Ack frame transmitted from the wireless communication apparatuses 10b and 10c in the step S10 is received by the wireless communication apparatus 10a and the process ends.

Figure 4:
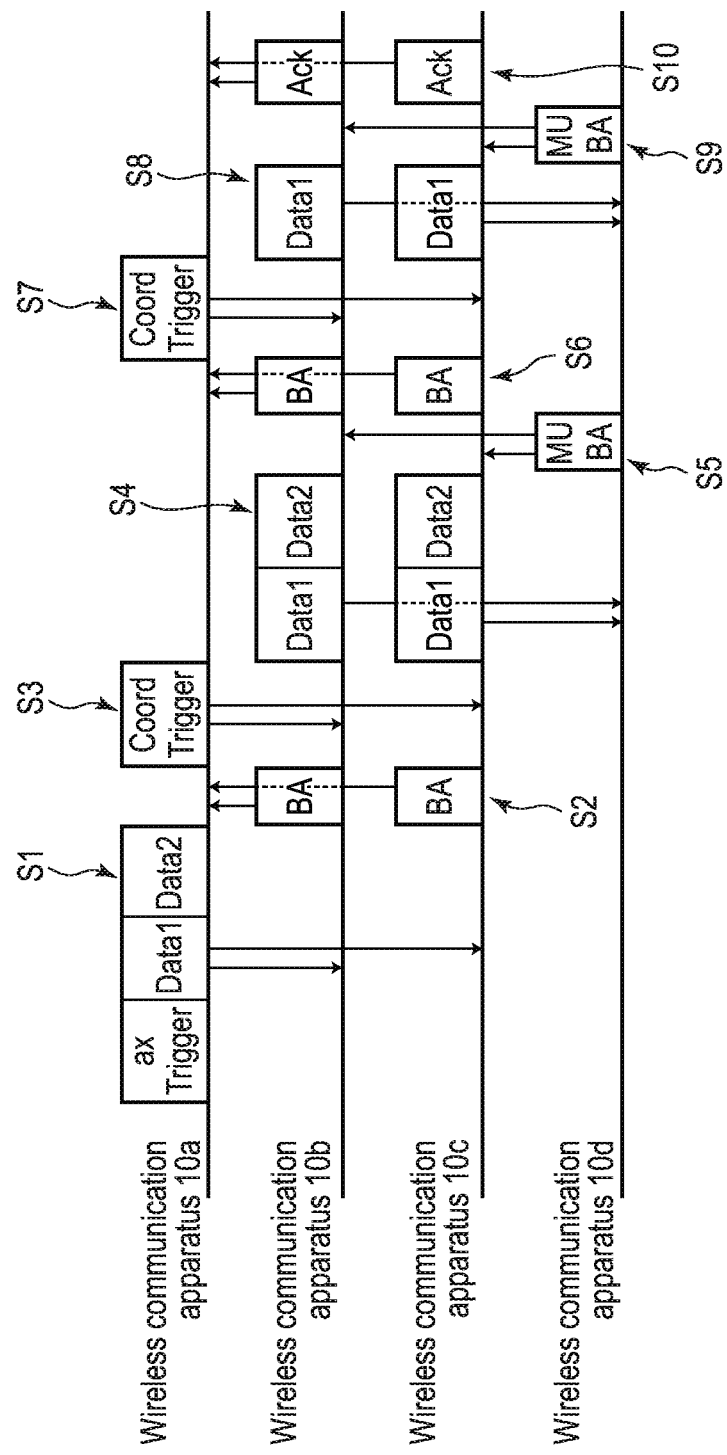
FIG. 4 illustrates a timing chart of an example of an operation of a network system of the first embodiment.

Although this is not shown in FIG. 4, the wireless communication apparatus 10a, which receives the Ack frame from the wireless communication apparatuses 10b and 10c may send a frame for notifying the completion of the cooperative transmission to the wireless communication apparatuses 10a and 10b.

Furthermore, in FIG. 4, the first data transmitted from the wireless communication apparatuses 10b and 10c are successfully received by the wireless communication apparatus 10d. If the first data are not received by the wireless communication apparatus 10d (that is, if the MUBA frames including the reception result indicative of no reception of the first data from both the wireless communication apparatuses 10b and 10c are received), the processes of step 6 and thereafter will be repeated. Note that the number of times of repeating the processes may be set in advance.

In the present embodiment, as described above, the wireless communication apparatuses 10b and 10c operate in cooperation to transmit the target data (first and second data) from wireless communication apparatus 10a to wireless communication apparatus 10d, and therein, even if the target data are not received by the wireless communication apparatus 10d, the wireless communication apparatus 10a mainly instructs the retransmission of the target data (retransmits the second trigger frame) to complete the transmission of all of the target data. Therefore, in this embodiment, smooth wireless communication (coordinated transmission of target data) can be realized.

In the present embodiment, the wireless communication apparatus 10a transmits a plurality of data (e.g., the first and second data); however, even if a single piece of data is sent and the piece of data is not received by the wireless communication apparatus 10d, the wireless communication apparatus 10a can mainly instruct the retransmission of the piece of data, and smooth wireless communication can be achieved.

Furthermore, in this embodiment, the wireless communication apparatuses 10a to 10d are considered to perform the wireless communication conforming to, for example, IEEE802.11ac. The present embodiment; however, may be applied to the cooperative transmission in a network system including communication apparatuses conforming to other-standard to perform the wireless communication using CSMA/CA.

Furthermore, as described above, in a case where the wireless communication apparatuses 10a to 10c are wireless base stations and the wireless communication apparatus 10d is a wireless terminal, the present embodiment can be applied to the transmission of the data from the wireless communication apparatus 10a (wireless base station) to the wireless communication apparatus 10d (wireless terminal). However, the present embodiment may be applied to a case where the data are transmitted from the wireless communication apparatus 10d (wireless terminal) to the wireless communication apparatus 10a (wireless base station).

First Modification

Next, the first modification of the first embodiment will be described. The structure of the network system and the structure of the wireless communication apparatus in this modification are the same as those of the first embodiment. Thus, the detailed description thereof will be omitted. The same applies to other modifications of the first embodiment described below.

This modification differs from the first embodiment in respect that a MUBA frame transmitted from the wireless communication apparatus 10d is not received by one of the wireless communication apparatuses 10b and 10c.

Figure 5:
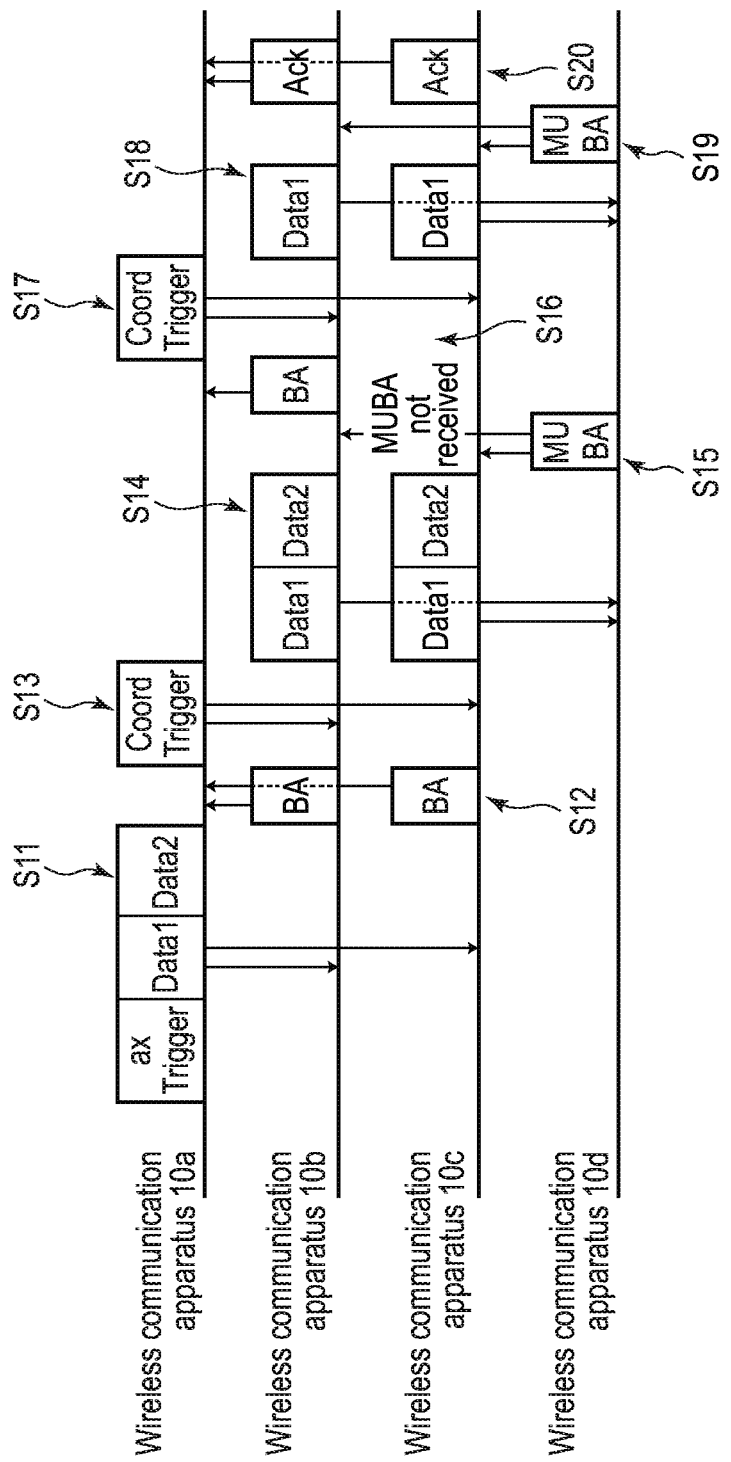
FIG. 5 illustrates a timing chart of an example of an operation of the network system of a first modification of the first embodiment.

Now, referring to the timing chart of FIG. 5, an example of the operation of the network system of this modification (communication apparatuses 10a to 10d) will be explained.

First, the processes of steps S11 to S15, which correspond to the processes of steps S1 to S5 shown in FIG. 4 are performed.

Here, in step S15, the MUBA frame is transmitted from the wireless communication apparatus 10d to the wireless communication apparatuses 10b and 10c, for example, and a case where the MUBA frame is not received by the wireless communication apparatus 10c because of the communication environment around the wireless communication apparatus 10c will be considered.

In that case, the wireless communication apparatus 10b, which received the MUBA frame, will, as in the first embodiment described above transmit the BA frame to the wireless communication apparatus 10a, and the wireless communication apparatus 10c which has not received the MUBA frame does not transmit the BA frame and stands by (step S16). According to this, interference (affection) to the data frame transmitted from the wireless communication apparatus 10b in step S16 by the wireless communication apparatus 10c, which has not received a MUBA frame, transmitting the data frame including all of the target data (first and second data) can be avoided.

In step S16, the BA frame transmitted from the wireless communication apparatus 10b will be received by the wireless communication apparatus 10a.

Here, as explained in FIG. 4 above, if only the second data are received by the wireless communication apparatus 10d from the wireless communication apparatus 10b, the wireless communication apparatus 10a recognizes that only the second data are received from the wireless communication apparatus 10d based on the reception result included in the BA frame received from the wireless communication apparatus 10b (reception result for the wireless communication apparatus 10b), and recognizes that the first data are not received by the wireless communication apparatus 10d. In this case, the wireless communication apparatus 10a retransmits the second trigger frame in order to instruct the retransmission of the target data (first data) to the wireless communication apparatuses 10b and 10c (step S17). Note that the process of this step S17 is the same as the process of step S7 shown in FIG. 4.

When the process of step S17 is executed, the processes of steps S18 to S20 corresponding to the processes of steps S8 to S10 shown in FIG. 4 above are executed.

In the above-mentioned step S16, the BA frame is transmitted from the wireless communication apparatus 10b to the wireless communication apparatus 10a; however, the BA frame may be a MUBA frame from the wireless communication apparatus 10d.

Furthermore, in step S16, the wireless communication apparatus 10c may transmit the BA frame indicative of no reception of a MUBA frame from the wireless communication apparatus 10d to the wireless communication apparatus 10a. In that case, the BA frame from the wireless communication apparatus 10b to the wireless communication apparatus 10a and the BA frame from the wireless communication apparatus 10c to the wireless communication apparatus 10a are wireless signals that are orthogonal to each other.

As described above, in this modification, the wireless communication apparatuses 10b and 10c operate in cooperation to transmit the target data from the wireless communication apparatus 10a to the wireless communication apparatus 10d, and even in a case where one of the wireless communication apparatuses 10b and 10c may not receive a MUBA frame from the wireless communication apparatus 10d, the wireless communication apparatus 10a mainly instructs the retransmission of the target data (retransmit the second trigger frame), which enables smooth wireless communication.

Second Modification

Next, a second modification of the first embodiment will be described. In the first modification of the first embodiment described above, a case where a MUBA frame transmitted from the wireless communication apparatus 10d is not received in the wireless communication apparatus 10c is explained. However, the second modification is different from the first modification of the first embodiment in respect that the MUBA frame is not received by both the wireless communication apparatuses 10b and 10c.

Figure 6:
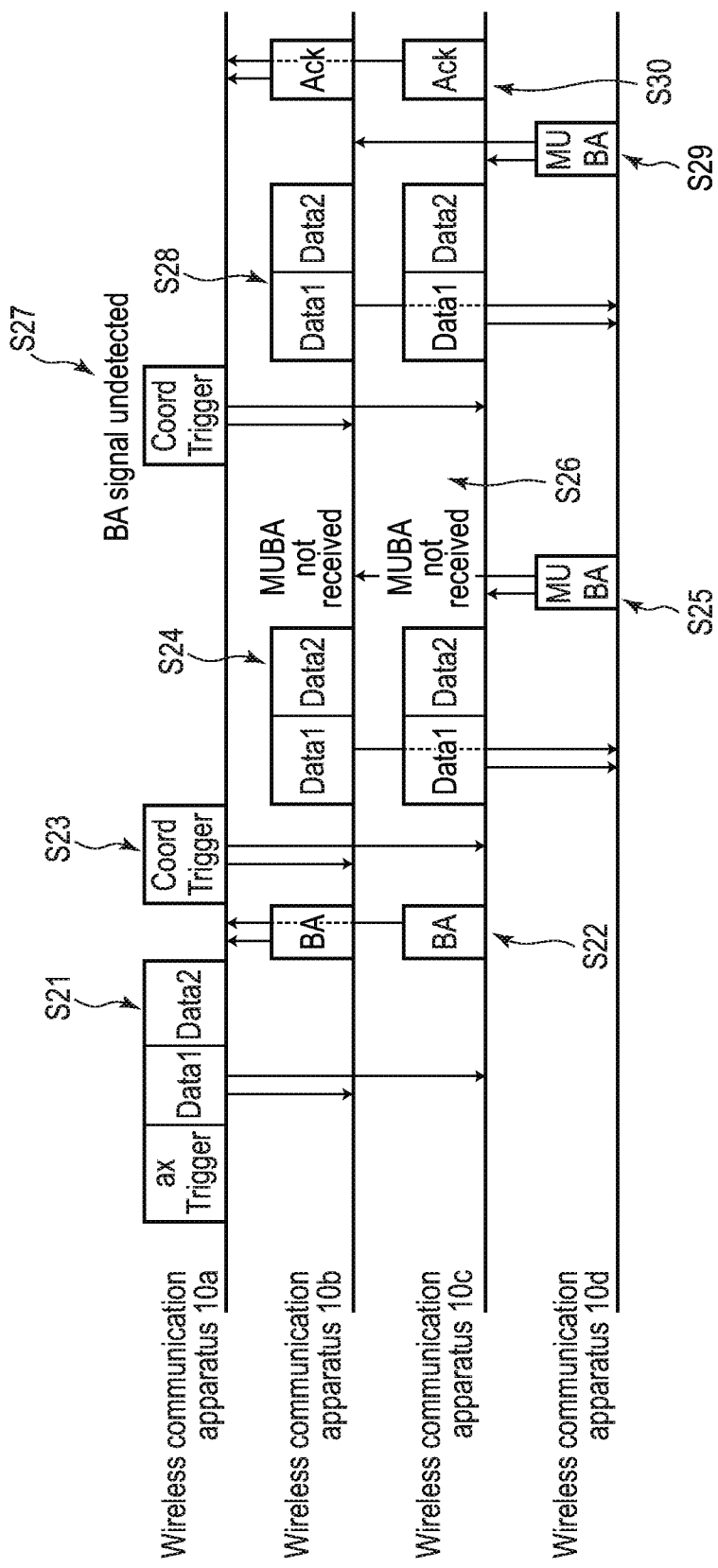
FIG. 6 illustrates a timing chart of an example of the operation of the network system of a second modification of the first embodiment.

Referring to the timing chart in FIG. 6, an example of the operation of the network system in this modification (wireless communication apparatuses 10a to 10d) will be described.

First, the processes of steps S21 to S25, which correspond to the processes of steps S1 to S5 shown in FIG. 4 are performed.

Here, in step S25, the MUBA frame is transmitted from the wireless communication apparatus 10d to the wireless communication apparatuses 10b and 10c, for example, and a case where the MUBA frame is not received by the wireless communication apparatuses 10b and 10c because of the communication environment around the wireless communication apparatuses 10b and 10c will be considered.

In that case, the wireless communication apparatuses 10b and 10c, which have not received a MUBA frame, will not transmit a BA frame and stand by (step S26).

According to this, the wireless communication apparatus 10a cannot receive a BA frame from the wireless communication apparatuses 10b and 10c (BA signal), (that is, the wireless signal cannot be detected), and in a case where a BA frame is not received in a certain period after the second trigger frame has been transmitted form the wireless communication apparatus 10a in step S23 (second wireless signal is not detected), the wireless communication apparatus 10a retransmits the second trigger frame (first wireless signal) to the wireless communication apparatuses 10b and 10c to instruct the retransmission of the target data (first and second data) (step S27). The second trigger frame transmitted in this step S27 defines that the data to be cooperatively transmitted are the first and second data.

The above-mentioned certain period means a time from transmission of the second trigger frame by the wireless communication apparatus 10a to supposed detection (reception) of a wireless signal (for example, BA frame, Ack frame, or the like) transmitted from the wireless communication apparatuses 10b and 10c (that is, to a time the wireless communication apparatuses 10b and 10c transmitting the BA frame to the wireless communication apparatus 10a). This certain period may be a predetermined time, or it may be determined based on a transmission time calculated based on the transmission rate and a data length of target data, transmission time of MUBA frame, and transmission intervals of frames.

The second trigger frame transmitted from the wireless communication apparatus 10a in step S27 is received by the wireless communication apparatuses 10b and 10c. By receiving the second trigger frame, the wireless communication apparatuses 10b and 10c transmit a series of data frames containing a frame including the first data and a frame including the second data to the wireless communication apparatus 10d (step S28).

After the process of step S28 is executed, the processes of steps S29 and S30 are executed. The processing of steps S29 and S30 is generally the same as the processing of steps S9 and S10 shown in FIG. 4 above. Specifically, for example, in step S29, the wireless communication apparatus 10d transmits a MUBA frame including a reception result indicative of the reception of both the first and second data from each of the wireless communication apparatuses 10b and 10c to the wireless communication apparatuses 10b and 10c, and in step S30, the wireless communication apparatuses 10b and 10c transmit an Ack frame to the wireless communication apparatus 10a, and the process ends.

In the above-mentioned step S26, the wireless communication apparatuses 10b and 10c may transmit a BA frame indicating that a MUBA frame has not been received from the wireless communication apparatus 10d to the wireless communication apparatus 10a. In this case, the BA frame from the wireless communication apparatus 10b to the wireless communication apparatus 10a and the BA frame from the wireless communication apparatus 10c to the wireless communication apparatus 10a are transmitted on wireless signals orthogonal to each other.

As described above, in the present modification, if the wireless communication apparatus 10a does not receive any BA frame transmitted from the wireless communication apparatuses 10b and 10c within a certain period after the transmission of the second trigger frame (first wireless signal) (that is, the second wireless signal is not detected), the wireless communication apparatus 10a transmits the second trigger frame (third wireless signal) to the wireless communication apparatuses 10b and 10c in order to instruct the retransmission of the target data.

That is, in this modification, the wireless communication apparatuses 10b and 10c operate in cooperation to transmit the target data from the wireless communication apparatus 10a to the wireless communication apparatus 10d, and even in a case where both of the wireless communication apparatuses 10b and 10c may not receive a MUBA frame from the wireless communication apparatus 10d, the wireless communication apparatus 10a mainly instructs the retransmission of the target data (retransmit the second trigger frame), which enables smooth wireless communication.

Third Modification

Next, a third modification of the first embodiment will be described. In the first embodiment described above, a BA frame containing the reception result for the wireless communication apparatus 10b and a BA frame containing the reception result for wireless communication apparatus 10c are transmitted to the wireless communication apparatus 10a. The present modification is different from the first embodiment in respect that contents of the BA frames to be transmitted from the wireless communication apparatuses 10b and 10c are different.

Hereinafter, an example of the operation of the network system (wireless communication apparatuses 10a to 10d) of this modification will be explained. This section will be described with reference to FIG. 4 for convenience.

First, the processing of steps S1 to S5 described in the first embodiment is performed.

Next, the processing of step S6 in the present modification will be described. In the first embodiment described above, for example, the wireless communication apparatus 10b extracts only the reception result with respect to the wireless communication apparatus 10b from the MUBA frame, and transmits the BA frame including the reception result to the wireless communication apparatus 10a. In contrast, in this modification, the wireless communication apparatus 10b transmits a BA frame including a reception result to which reception results for the wireless communication apparatuses 10b and 10c included in the MUBA frames are synthesized (merged) to the wireless communication apparatus 10a.

Specifically, the MUBA frame received from the wireless communication apparatus 10d includes the reception result with respect to the wireless communication apparatus 10b and the reception result with respect to the wireless communication apparatus 10c. The wireless communication apparatus 10b can generate a BA frame including a single reception result (reception results of the first and second data in the wireless communication apparatus 10d) indicative of whether or not each of the first and second data is received in the wireless communication apparatus 10d by taking a logical sum of two reception results of each of the first and second data.

In this example, the BA frame sent from the wireless communication apparatus 10b to the wireless communication apparatus 10a is explained. The same applies to the BA frames sent from wireless communication apparatus 10c to wireless communication apparatus 10a. That is, in this embodiment, the same BA frame from the wireless communication apparatuses 10b and 10c are transmitted.

In this case, the BA frame from the wireless communication apparatus 10b to the wireless communication apparatus 10a and BA frame from wireless communication apparatus 10c to wireless communication apparatus 10a in step S6 are transmitted on wireless signals that are orthogonal to each other. Note that, for example, if the wireless communication apparatus 10a cannot receive the BA frame transmitted from the wireless communication apparatus 10b or the BA frames sent from the communication apparatus 10c separately, the BA frame from the wireless communication apparatus 10b to wireless communication apparatus 10a and the BA frame from the wireless communication apparatus 10c to the wireless communication apparatus 10a may be transmitted using the same frequency such that these BA frames are synthesized on the reception in the wireless communication apparatus 10a to be one signal (that is, in a format which can synthesize the frames on the reception).

The BA frames transmitted from the wireless communication apparatuses 10b and 10c in step S6 will be received by the wireless communication apparatus 10a. In this case, the wireless communication apparatus 10a can recognize the reception result of the target data in the wireless communication apparatus 10d from at least one of the BA frames transmitted from the wireless communication apparatuses 10b and 10c (that is, whether or not each of the first and second data is received by the wireless communication apparatus 10d).

Then, the processes of steps S7 to S10 described in the above-described first embodiment are executed. As described above, for example, if the wireless communication apparatus 10a cannot receive the BA frames sent from the wireless communication apparatuses 10b and 10c separately, transmission of the Ack frame from the wireless communication apparatus 10b to the wireless communication apparatus 10a and the Ack frame from the wireless communication apparatus 10c to the wireless communication apparatus 10a in step S10 may be performed using the same frequency such that the frames are synthesized on the reception by the wireless communication apparatus 10a.

As described above, in the present modification, if the target data (first and second data) are received from at least one of the wireless communication apparatuses 10b and 10c, a delivery acknowledge of the target data is made, and if the target data (first and second data) are not received from both the wireless communication apparatuses 10b and 10c, the reception result is synthesized as a delivery acknowledge of the target data is not made. A BA frame to which the synthesized result is reflected is transmitted from each of the wireless communication apparatuses 10b and 10c to the wireless communication apparatus 10a.

In the present modification, with such a structure, the wireless communication apparatus 10a does not need to recognize a reception result of target data in the wireless communication apparatus 10d in consideration of both the BA frames transmitted from the wireless communication apparatuses 10b and 10c (that is, two reception results are not necessarily synthesized in the wireless communication apparatus 10a), and a process loading (process amount) can be reduced in the wireless communication apparatus 10a.

Fourth Modification

Next, a fourth modification of the first embodiment will be described. In the first embodiment described above, a MUBA frame is transmitted from the wireless communication apparatus 10d to the wireless communication apparatuses 10b and 10c. This modification differs from the first embodiment in respect that the BA frame is transmitted from the wireless communication apparatus 10d.

Figure 7:
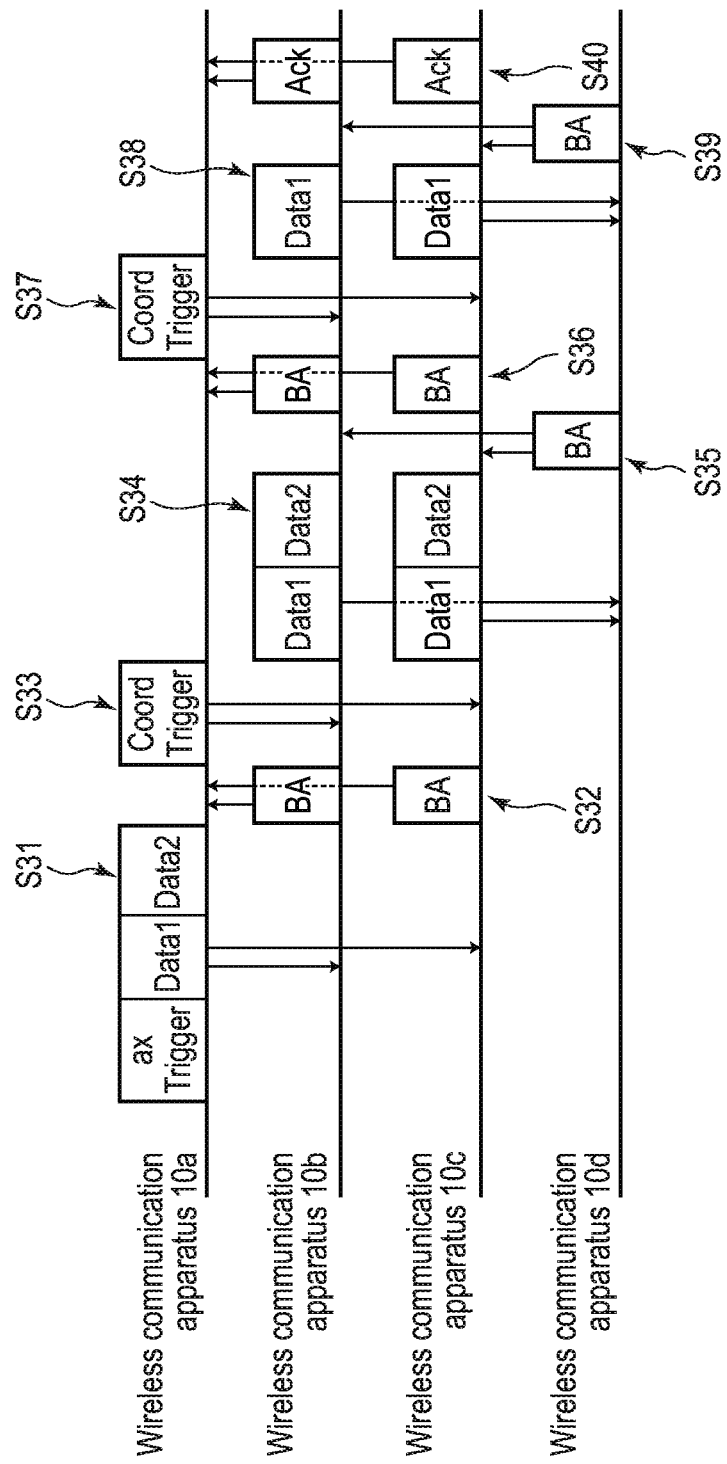
FIG. 7 illustrates a timing chart of an example of the operation of the network system of a fourth modification of the first embodiment.

Referring to the timing chart of FIG. 7, an example of the network system in this modification (wireless communication apparatuses 10a to 10d) will be described.

First, the process of steps S31 to S34, which corresponds to the process of steps S1 to S4 shown in FIG. 4 is performed.

Here, in the first embodiment described above, a MUBA frame including the reception results for the wireless communication apparatuses 10b and 10c will be sent from wireless communication apparatus 10d to the wireless communication apparatuses 10b and 10c. In contrast, in the present modification, the wireless communication apparatus 10d transmits the BA frames to the wireless communication apparatuses 10b and 10c (step S35). Note that the BA frame sent in step S35 includes the reception result in which the reception result with respect to the wireless communication deice 10b and the reception result with respect to the wireless communication apparatus 10c are synthesized (that is, a single reception result). That is, the BA frame transmitted in step S35 is the same as the BA frame transmitted from the wireless communication apparatuses 10b and 10c to the wireless communication apparatus 10a in the third modification of the first embodiment.

Next, the wireless communication apparatuses 10b and 10c receive the BA frame transmitted from the wireless communication apparatus 10d in step S35. In this case, the wireless communication apparatuses 10b and 10c transmit the BA frame received from the wireless communication apparatus 10d to the wireless communication apparatus 10a (step S36).

The BA frames transmitted from the wireless communication apparatuses 10b and 10c in step S36 are received at the communication apparatus 10a. In this case, as explained in the section of the third modification of the first embodiment, the wireless communication apparatus 10a can recognize the reception result of the target data in the wireless communication apparatus 10d from at least one of the BA frames transmitted from the wireless communication apparatuses 10b and 10c.

Then the process of steps S37 to S40, which corresponds to the process of steps S7 to S10 shown in FIG. 4 above is executed.

As described above, in this modification, the reception results for wireless communication apparatuses 10b and 10c are synthesized in the wireless communication apparatus 10d, and the BA frame including the synthesized result is transmitted from the wireless communication apparatus 10d to the wireless communication apparatuses 10b and 10c. According to this structure, since two reception results (reception results for the wireless communication apparatuses 10b and 10c) are not required to be synthesized, a load in the processes (amount of process) of the wireless communication apparatuses 10b and 10c can be reduced as compared to the third modification of the first embodiment.

Fifth Modification

Next, a fifth modification of the first embodiment will be described. In the first embodiment described above, the wireless communication apparatus 10d has a function to receive the data frames from the wireless communication apparatuses 10b and 10c separately. This modification is different from the first embodiment in respect that the wireless communication apparatus 10d does not have a function to receive the data frames from the wireless communication apparatuses 10b and 10c separately (that is, cannot receive data frames separately).

Hereinafter, an example of the operation of the network system (wireless communication apparatuses 10a to 10d) of this modification will be explained. This section will be described with reference to FIG. 7 for convenience.

First, the steps S31 to S33 described in the fourth modification of the first embodiment described above (steps S1 to S3 of FIG. 4) are executed.

Here, in the first embodiment described above, the data frames transmitted from the wireless communication apparatus 10b to the wireless communication apparatus 10d and the data frames transmitted from the wireless communication apparatus 10c to the wireless communication apparatus 10d are on the wireless signals orthogonal to each other. In this modification, the wireless communication apparatus 10d cannot receive the data frames separately. Therefore, in this modification, the wireless communication apparatuses 10b and 10c transmit the data frames on the same frequency such that the wireless communication apparatus 10d can receive the data frames as a single signal (step S34). In other words, in step S34, the wireless communication apparatuses 10b and 10c transmit data frames (wireless signals) of format which can be synthesized on the reception by the wireless communication apparatus 10d using the same frequency.

Note that a method of transmitting data frames from the wireless communication apparatuses 10b and 10c (whether to send data frames in a format to be orthogonal to each other or in a synthesizable format) is, for example, set to the second trigger frame transmitted from the wireless communication apparatus 10a in step S33. In this case, the method of transmitting the data frame may include a retransmission method indicating that the retransmission of the target data is initiated by the wireless communication apparatus 10a. Furthermore, the method of transmitting the data frame may also be set before the cooperative transmission is started (for example, in the time of establishing the communication link between the wireless communication apparatus 10a and the wireless communication apparatuses 10b and 10c or in the time of structuring the network system of FIG. 1).

When the process of step S34 is executed, the wireless communication apparatus 10d receives the data frames from the wireless communication apparatuses 10b and 10c. Note that, in this modification, since the data frames which can be synthesized on the reception are transmitted from the wireless communication apparatuses 10b and 10c, the wireless communication apparatus 10d receives the data frames transmitted from the wireless communication apparatuses 10b and 10c as a single data frame instead of separate data frames.

In this case, the wireless communication apparatus 10d transmits a BA frame including the reception result indicating whether or not the target data (first and second data) are received based on the received data frame to the wireless communication apparatuses 10b and 10c (steps S35). Note that, as mentioned above, since the wireless communication apparatus 10d does not receive the data frames transmitted from the wireless communication apparatus 10b and data frames from the wireless communication apparatus 10c separately, (that is, it is not possible to obtain the reception result for each of the wireless communication apparatuses 10b and 10c), the frames transmitted from the wireless communication apparatus 10d in this modification is a BA frame, not a MUBA frame.

When the process of step S35 is executed, the processing of steps S36 to S40 are executed. In step S38, as in the process of step S34, a data frame in a format that can be synthesized when received by the wireless communication apparatus 10d are transmitted from the wireless communication apparatuses 10b and 10c.

As described above, in the present modification, even if the wireless communication apparatus 10d is not structured (does not have a function) to receive data frames (target data) to be transmitted from each of the wireless communication apparatuses 10b and 10c separately, a smooth wireless communication can be achieved.

Second Embodiment

Next, the second embodiment will be described. Since the structures of the network system and the wireless communication apparatuses of the present embodiment are the same as those of the first embodiment, the detailed description will be omitted. The same applies to the following modifications of the present embodiment.

In the first embodiment described above, the wireless communication apparatus 10a with the structure of instructing the retransmission of the target data on the initiative of the wireless communication apparatus 10a. The present embodiment is different from the first embodiment in respect that the wireless communication apparatuses 10b and 10c controlled by the wireless communication apparatus 10a mainly performs the retransmission.

Hereinafter, referring to the sequence chart (message sequence chart) of FIG. 8, an example of the operation of the network system of the present embodiment (wireless communication apparatuses 10a to 10d) will be explained.

In the following explanation, explanation of the same parts as those of the aforementioned first embodiment will be omitted. Only the different parts will be mainly described.

In this embodiment, as in the first embodiment described above, the cooperative transmission technology is applied, and it is assumed that the wireless communication apparatus 10a transmits certain data (target data) to the wireless communication apparatus 10d. Furthermore, the target data transmitted from the wireless communication apparatus 10a to the wireless communication apparatus 10d include the first data (Data1) and the second data (Data2).

First, the wireless communication apparatus 10a transmits a first trigger frame (ax Trigger) indicating that the target data are data to be used for coordinated transmission, and a data frame containing the target data to the wireless communication apparatuses 10b and 10c (step S41).

Next, the wireless communication apparatuses 10b and 10c receive the first trigger frame and the data frame transmitted from the wireless communication apparatus 10a in the above mentioned step S41.

When the first trigger frame and data frame are received by the wireless communication apparatuses 10b and 10c, each of the wireless communication apparatuses 10b and 10c transmits a BA frame indicative of the reception of the data frame to the wireless communication apparatus 10a (step S42). The BA frame from the wireless communication apparatus 10b to the wireless communication apparatus 10a and the BA frame from the wireless communication apparatus 10c to wireless communication apparatus 10a in step S42 are transmitted on the wireless signals that are orthogonal to each other.

The BA frames transmitted from the wireless communication apparatuses 10b and 10c in step S42 will be received by the wireless communication apparatus 10a. Thus, the wireless communication apparatus 10a recognizes that the target data are received by the wireless communication apparatuses 10b and 10c, and transmits the second trigger frame (Coord Trigger) instructing the start of the coordinated transmission to the wireless communication apparatuses 10b and 10c (step S43). The second trigger frame transmitted in step S43 includes a setting that data to be subjected to the cooperative transmission are the target data (first and second data), and for example, a transmission rate of the target data, a transmission time calculated from the data length of the target data, number of retransmissions of the target data, and intervals between the retransmissions of the target data (transmission intervals on the retransmission) may further be set. Note that, in the present embodiment, a retransmission method of retransmitting the target data performed mainly by the wireless communication apparatuses 10b and 10c (second retransmission method) may further be set.

The second trigger frame transmitted from the wireless communication apparatus 10a in step S43 is received by the wireless communication apparatuses 10b and 10c. The wireless communication apparatuses 10b and 10c receive the second trigger frame, and thereby transmitting the data frame (i.e., target data) to the wireless communication apparatus 10d (step S44). The data frame from the wireless communication apparatus 10b to the wireless communication apparatus 10d and the data frame from wireless communication apparatus 10c to wireless communication apparatus 10d in step S44 are transmitted on the wireless signals orthogonal to each other.

When the process of step S44 is performed, the wireless communication apparatus 10d receives the data frames transmitted from the wireless communication apparatuses 10b and 10c. Note that, in the present embodiment, the wireless communication apparatus 10d has a function to separately receive the data frame transmitted from the wireless communication apparatus 10b and the data frame from the wireless communication apparatus 10c.

Next, the wireless communication apparatus 10d transmits a MUBA frame including a reception result of the target data (first and second data) in the wireless communication apparatus 10*d* to the wireless communication apparatuses 10*b* and 10*c* (step S45). It is assumed that the MUBA frame transmitted in step S45 include, as in the first embodiment described above, the reception result indicating that the second data were received from the communication apparatus 10*b* (reception result with respect to the wireless communication apparatus 10*b*) and reception result indicating that the second data were received from the wireless communication apparatus 10*c* (reception result with respect to the wireless communication apparatus 10*c*).

When the process of step S45 is executed, the wireless communication apparatuses 10*b* and 10*c* receive a MUBA frame transmitted from the wireless communication apparatus 10*d* in step S45.

Here, the wireless communication apparatuses 10*b* and 10*c* can recognize that the first data transmitted form the wireless communication apparatuses 10*b* and 10*c* are not received by the wireless communication apparatus 10*d* by referring the reception result included in the received MUBA frame.

The wireless communication apparatuses 10*b* and 10*c* are to recognize the reception result of the target data in the wireless communication apparatus 10*d* in consideration of both the reception results included in the MUBA frame received from the wireless communication apparatus 10*d* (reception results for the wireless communication apparatus 10*b* and wireless communication apparatus 10*c*).

As mentioned above, if it is recognized that the first data are not received by the wireless communication apparatus 10*d*, the wireless communication apparatuses 10*b* and 10*c* retransmit the data frame including the first data after a certain period has been passed since the MUBA frame was received (step S46). The certain period may be a time set as transmission interval on the retransmission in the second trigger frame transmitted from the wireless communication apparatus 10*a* in step S43, or a time set before the start of the cooperative communication, or may be a predetermined time.

When the process of step S46 is executed, the wireless communication apparatus 10*d* receives the data frame (first data) transmitted from the wireless communication apparatuses 10*b* and 10*c*, and transmits the MUBA frame to the wireless communication apparatuses 10*b* and 10*c* (step S47). In the wireless communication apparatus 10*d*, for example, if the first data (data frame including the same) are successfully received from both the wireless communication apparatuses 10*b* and 10*c*, the MUBA frame to be transmitted from step S47 includes a reception result indicative of the reception of the first data from the wireless communication apparatus 10*b* (reception result with respect to the wireless communication apparatus 10*b*) and a reception result indicative of the reception of the first data from the wireless communication apparatus 10*c* (reception result for the wireless communication apparatus 10*c*).

Next, the wireless communication apparatuses 10*b* and 10*c* receive a MUBA frame transmitted from the wireless communication apparatus 10*d* in step S47. In that case, the wireless communication apparatuses 10*b* and 10*c* can recognize that the first data are received by the wireless communication apparatus 10*d* based on the reception result included in the received MUBA frame (that is, delivery of the first data is acknowledged). Thus, since the target data used in the cooperative transmission (first and second data) are all received by the wireless communication apparatus 10*d*, and the wireless communication apparatuses 10*b* and 10*c* transmit an Ack frame indicative of the completion of the process to the wireless communication apparatus 10*a* (step S48).

In step S48, the Ack frame transmitted from the wireless communication apparatus 10*b* to the wireless communication apparatus 10*a* and the Ack frame transmitted from the wireless communication apparatus 10*c* to the wireless communication apparatus 10*a* are transmitted on wireless signals orthogonal to each other.

It is explained that the Ack frame is sent in step S48; however, each of the wireless communication apparatuses 10*b* and 10*c* may transmit a BA frame, for example, or a MUBA frame received from the wireless communication apparatus 10*d*.

If the process of step S48 is executed, then the Ack frame transmitted from each of the wireless communication apparatuses 10*b* and 10*c* is received by the wireless communication apparatus 10*a* in said step S48, and the process ends.

Figure 8:
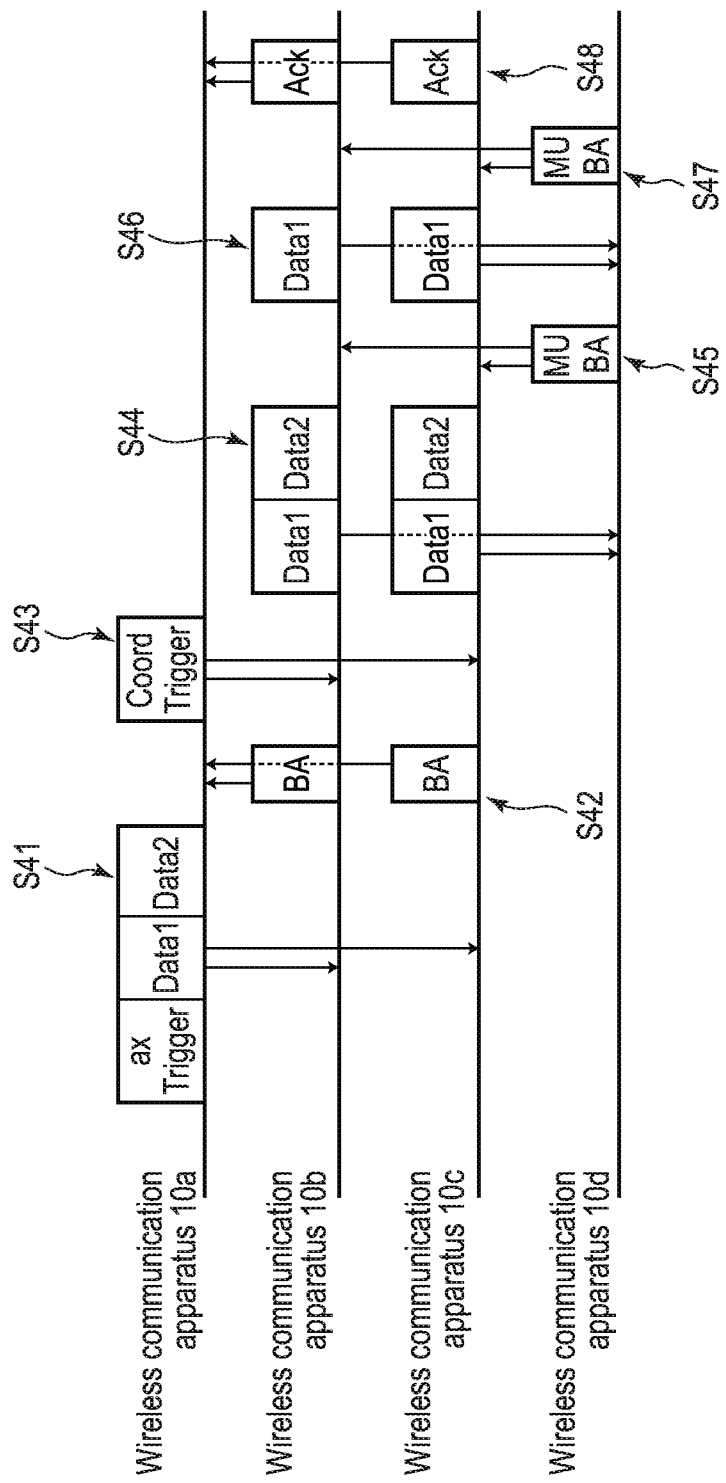
FIG. 8 illustrates a timing chart of an example of the operation of the network system of a second embodiment.

Note that, although omitted in FIG. 8, the wireless communication apparatus 10*a* which has received the Ack frame transmitted from each of the wireless communication apparatuses 10*b* and 10*c* may function to transmit a frame to notify the completion of the cooperative transmission to the wireless communication apparatuses 10*b* and 10*c*.

In FIG. 8, in step S46, a case where the first data from the wireless communication apparatuses 10*b* and 10*c* have been successfully received by the wireless communication apparatus 10*d* is indicated; however, if the first data are not received by the wireless communication apparatus 10*d*, the processes of step S46 and thereafter are repeated. Note that the number of times of repeating the processes may be set in the second trigger frame as a retransmission number, or set on the establishment of the connection of the wireless apparatuses, or may be set preliminarily.

In the present embodiment, as described above, the wireless communication apparatuses 10*b* and 10*c* operate in cooperation to transmit the target data from the wireless communication apparatus 10*a* (first and second data) to the wireless communication apparatus 10*d*, and even if the target data are not received by the wireless communication apparatus 10*d*, the wireless communication apparatuses 10*b* and 10*c* mainly perform the retransmission of the target data, and thus, the transmission of all the target data can be completed. Thus, in the present embodiment, smooth wireless communication (coordinated transmission of target data) can be achieved.

First Modification

Next, the first modification of the second embodiment will be described. This modification differs from the second embodiment in respect that the MUBA frames transmitted from the wireless communication apparatus 10*d* are not received by one of the wireless communication apparatuses 10*b* and 10*c*.

Figure 9:
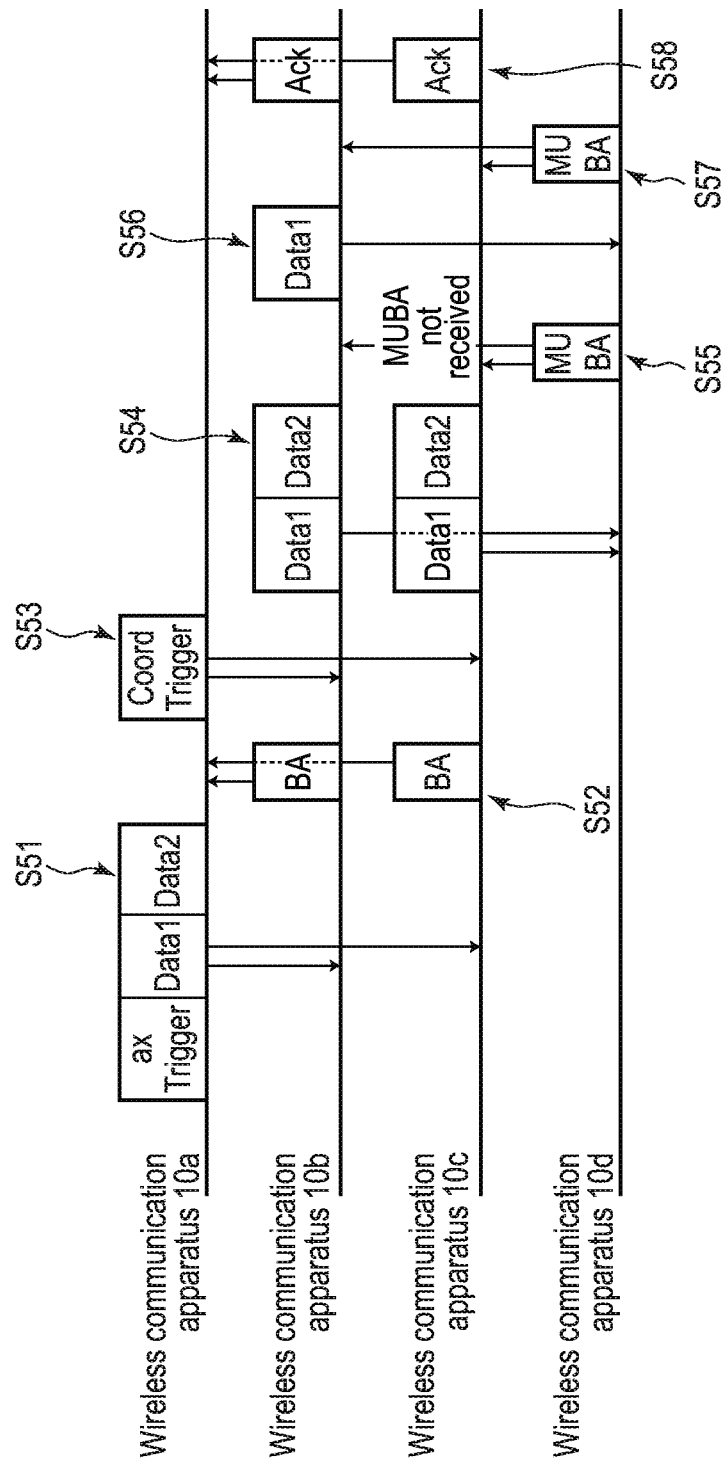
FIG. 9 illustrates a timing chart of an example of the operation of the network system of a first modification of the second embodiment.

Referring to the timing chart in FIG. 9, an example of the operation of the network system in this modification (communication apparatuses 10*a* to 10*d*) will be described.

First, steps S51 to S55, corresponding to the processing of steps S41 to S45 shown in FIG. 8 above, are executed.

Here, in step S55, the MUBA frame is transmitted from the wireless communication apparatus 10*d* to the wireless communication apparatuses 10*b* and 10*c*; however, a case where the MUBA frame is not received by the wireless communication apparatus 10*c* because of, for example, the communication environment around the wireless communication apparatus 10*c* is considered.

In that case, the wireless communication apparatus 10b, which received the MUBA frame, will retransmit the data frame including the first data to the wireless communication apparatus 10d as described above in FIG. 8 (step S56).

On the other hand, the wireless communication apparatus 10c, which has not received a MUBA frame, does not send a data frame and waits. According to this, it is avoided that the wireless communication apparatus 10c, which has not received a MUBA frame, transmits the data frame including all of the target data (first and second data), and thus, interference (affect) is applied to the data frame transmitted by the wireless communication apparatus 10b in step S56.

When the process of step S56 is executed, the processes of steps S57 and S58 corresponding to the processes of step S47 and S48 shown in FIG. 8 above are executed. Note that in step S57, a MUBA frame including a reception result indicating that the first data are received from the wireless communication apparatus 10b and a reception result including that the first data are not received from the wireless communication apparatus 10c is transmitted from the wireless communication apparatus 10d.

As described above, in this modification, the wireless communication apparatuses 10b and 10c operate in cooperation to transmit the target data from the wireless communication apparatus 10a to the wireless communication apparatus 10d, and for example, even if one of the wireless communication apparatuses 10b and 10c cannot receive the MUBA frame from the wireless communication apparatus 10d, the target data can be retransmitted mainly by the wireless communication apparatuses 10b and 10c. Furthermore, in this modification, since the wireless communication apparatus 10c which has not received the MUBA frame does not inappropriately retransmit the data signal, collision of the data frames transmitted from the wireless communication apparatus 10b does not occur. Thus, in the present modification, smooth wireless communication can be achieved.

Second Modification

Next, a second modification of the second embodiment will be described. In the first modification of the second embodiment described above, a case where the MUBA frame transmitted from the wireless communication apparatus 10d is not received in the wireless communication apparatus 10c is described. This modification is different from the first modification of the second embodiment in respect that the MUBA frame is not received by both the wireless communication apparatuses 10b and 10c.

Figure 10:
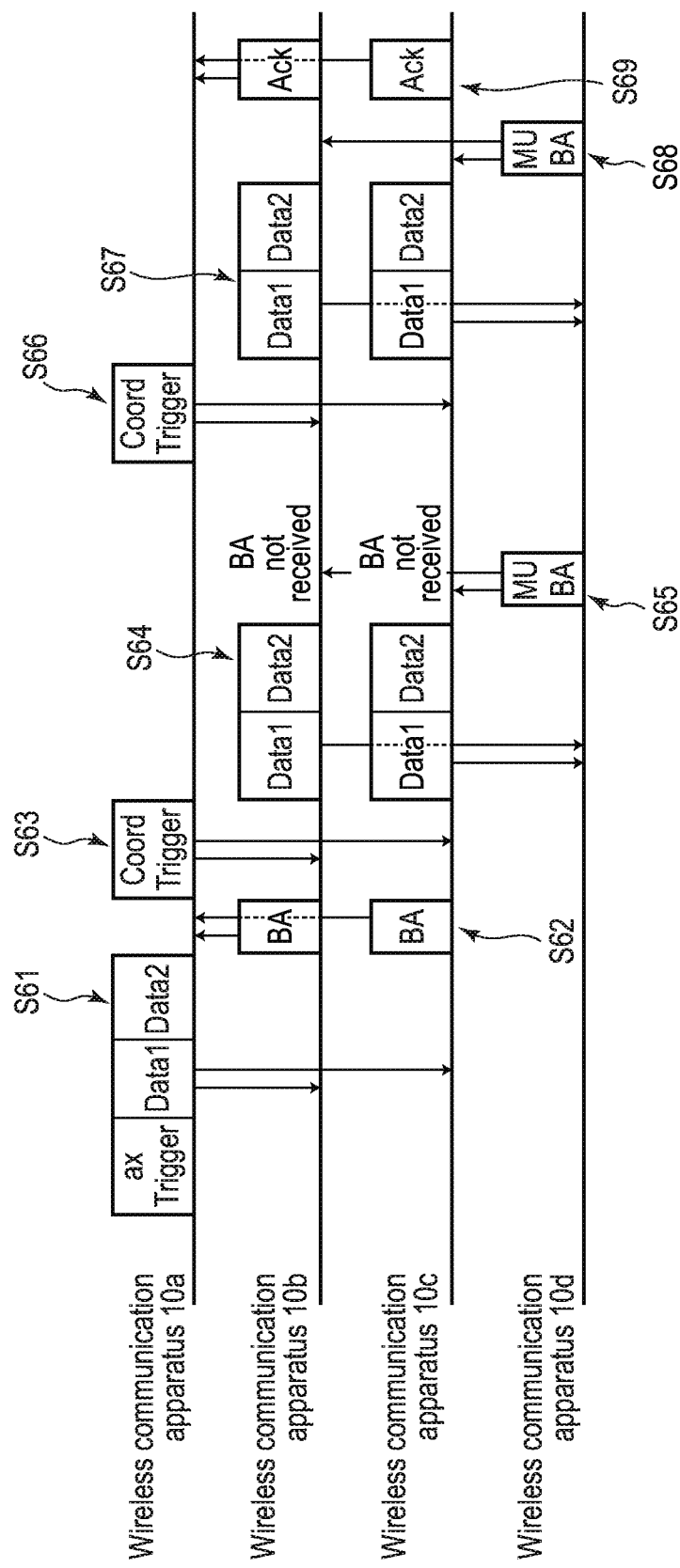
FIG. 10 illustrates a timing chart of an example of the operation of the network system of a second modification of the second embodiment.

Now, referring to the timing chart in FIG. 10, an example of the operation of the network system of this modification (communication apparatuses 10a to 10d) will be described.

First, steps S61 to S65, corresponding to the processing of steps S41 to S45 shown in FIG. 8 above, are executed.

Here, in step S65, the MUBA frame is transmitted from the wireless communication apparatus 10d to the wireless communication apparatuses 10b and 10c; however, a case where the MUBA frame is not received by both the wireless communication apparatuses 10b and 10c because of, for example, the communication environment around the wireless communication apparatuses 10b and 10c is considered.

In this case, the wireless communication apparatuses 10b and 10c, which have not received the MUBA frame, will not transmit the data frame and stand by.

On the other hand, the communication link between the wireless communication apparatus 10a and the wireless communication apparatuses 10b and 10c is established, and the wireless communication apparatus 10a can detect the wireless signal (for example, data frame, or the like) transmitted from the wireless communication apparatuses 10b and 10c.

Thus, if the wireless communication apparatus 10a does not detect a data frame, BA frame, or Ack frame (second wireless signal) transmitted from the wireless communication apparatuses 10b and 10c within a certain period after the second trigger frame (first wireless signal) has been transmitted from the wireless communication apparatus 10a in step S63 (or after the data frame transmitted from the wireless communication apparatuses 10b and 10c is detected in step S64), for example, the second trigger frame is retransmitted to the wireless communication apparatuses 10b and 10c in order to instruct the retransmission of the target data (first and second data) (step S66). The second trigger frame to be sent in this step S66 sets that the data to be cooperatively transmitted are the first and second data.

Note that the above-mentioned certain period means a time from transmission of the second trigger frame by the wireless communication apparatus 10a to supposed detection (reception) of a wireless signal (for example, data frame, Ack frame, or the like) transmitted from the wireless communication apparatuses 10b and 10c. This certain period may be a predetermined time, or it may be determined based on a transmission time calculated based on a data length of the target data, transmission time of MUBA frame, and transmission intervals of frames.

The second trigger frame transmitted from the wireless communication apparatus 10a in step S66 is received by the wireless communication apparatuses 10b and 10c. The wireless communication apparatuses 10b and 10c receive the second trigger frame, and thus, retransmit the data frame in which the frame including the first data and the frame including the second data are continuous to the wireless communication apparatus 10d (step S67).

After the processing of step S67, the processing of steps S68 and S69 is executed. The processing of steps S68 and S69 is the same as the processing of steps S47 and S48 shown in FIG. 8 above. Specifically, for example, in step S48, the wireless communication apparatus 10d transmits a MUBA frame including a reception result indicating that both the first and second data are received by the wireless communication apparatus 10d from each of the wireless communication apparatuses 10b and 10c in step S48 to the wireless communication apparatuses 10b and 10c, and in step S69, the wireless communication apparatuses 10b and 10c transmit an Ack frame to the wireless communication apparatus 10a and the process ends.

As described above, in the present modification, if the wireless communication apparatus 10a does not detect any data frame (second wireless signal) transmitted form the wireless communication apparatuses 10b and 10c within a certain period after the second trigger frame (first wireless signal) is transmitted, the wireless communication apparatus 10a retransmits the second trigger frame to the wireless communication apparatuses 10b and 10c in order to instruct the retransmission of the target data.

That is, in this modification, the wireless communication apparatuses 10b and 10c operate in cooperation to transmit the target data from the wireless communication apparatus 10a to the wireless communication apparatus 10d, and for example, in a case where both of the wireless communication apparatuses 10b and 10c cannot receive the MUBA frame from the wireless communication apparatus 10d, even if a retransmission method indicating that the retransmission of the target data is initiated by the wireless communication apparatuses 10b and 10c is set, the wireless communication apparatus 10a instructs retransmission of the target data (retransmits the second trigger frame), and thus, smooth wireless communication can be achieved.

Third Modification

Next, a third modification of the second embodiment will be described. In the second embodiment described above, a case where the MUBA frame is transmitted from the wireless communication apparatus 10d to the wireless communication apparatuses 10b and 10c is described. This variant is different from the second embodiment in respect that the BA frame is transmitted from the wireless communication apparatus 10d.

Figure 11:
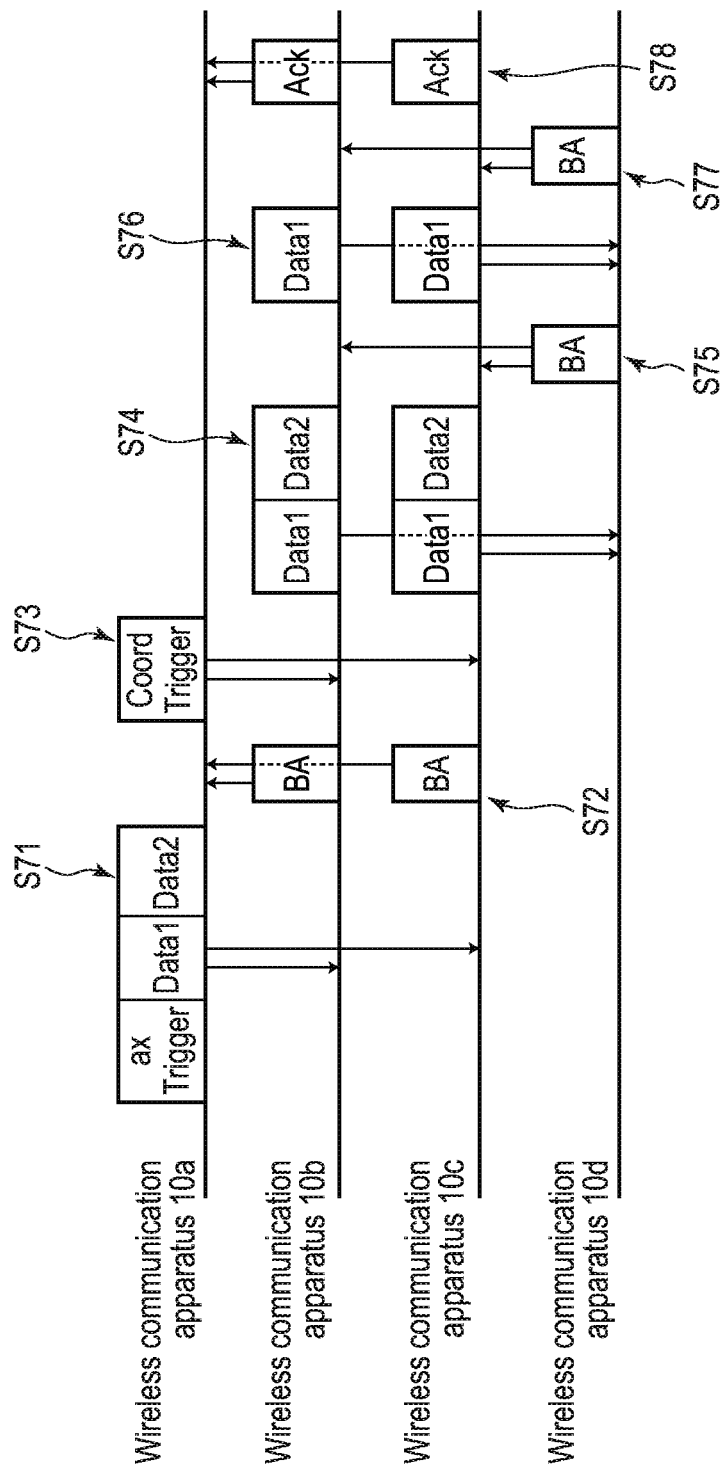
FIG. 11 illustrates a timing chart of an example of the operation of the network system of a third modification of the second embodiment.

Now, referring to the timing chart in FIG. 11, an example of the operation of the network system of this modification (communication apparatuses 10a to 10d) will be described.

First, steps S71 to S74, corresponding to the processing of steps S41 to S44 shown in FIG. 8 above, are executed.

Here, in the second embodiment described above, a MUBA frame including the reception results for the wireless communication apparatuses 10b and 10c will be sent from wireless communication apparatus 10d to wireless communication apparatuses 10b and 10c. In contrast, in the present modification, the wireless communication apparatus 10d transmits the BA frames to the wireless communication apparatuses 10b and 10c (step S75). This process of step S75 corresponds to the process of step S35 shown in FIG. 7 above, and the BA frame transmitted in step S75 includes a reception result in which the reception results with respect to the wireless communication apparatuses 10b and 10c are synthesized (that is, a single reception result).

In step S75, the BA frame transmitted from the wireless communication apparatus 10d is received by the wireless communication apparatuses 10b and 10c. In this case, the wireless communication apparatuses 10b and 10c can recognize the reception result of the target data in the wireless communication apparatus 10d from the BA frame transmitted from the wireless communication apparatus 10d.

Then, the process of steps S76 to S78, corresponding to the process of steps S46 to S48 shown in FIG. 8 above is executed.

As described above, in this modification, the reception results for wireless communication apparatuses 10b and 10c are synthesized in the wireless communication apparatus 10d, and the BA frame including the synthesized result is transmitted from the wireless communication apparatus 10d to the wireless communication apparatuses 10b and 10c. According to this structure, the wireless communication apparatuses 10b and 10c do not need to recognize the reception result of the target data in the wireless communication apparatus 10d in consideration of the reception results included in the MUBA frame (that is, does not need to synthesize two reception results in the wireless communication apparatuses 10b and 10c), and thus, a load of processing (amount of processing) of the wireless communication apparatuses 10b and 10c can be reduced.

Fourth Modification

Next, a fourth modification of the second embodiment will be described. In the second embodiment described above, the wireless communication apparatus 10d has a function to separately receive the data frames transmitted from the wireless communication apparatuses 10b and 10c. This modification differs from the second embodiment in respect that the wireless communication apparatus 10d does not have a function to separately receive the data frames transmitted from the wireless communication apparatuses 10b and 10c (that is, cannot receive data frames separately).

Now, an example of the operation of the network system (wireless communication apparatuses 10a to 10d) of the modification will be explained. Here, the explanation will be given with reference to FIG. 11 for convenience.

First, the steps S71 to S73 in the third modification of the second embodiment described above (steps S41 to S43 shown in FIG. 8) are executed.

Here, in the second embodiment described above, the data frames from the wireless communication apparatus 10b to the wireless communication apparatus 10d and the data frame from the wireless communication apparatus 10c to the wireless communication apparatus 10d are wireless signals orthogonal to each other. In this modification, the wireless communication apparatus 10d cannot receive the data frame separately. Thus, in this modification, the wireless communication apparatuses 10b and 10c transmit the data frame on the same frequency such that the wireless communication apparatus 10d can receive the data frames in a synthesized manner on the same frequency (step S74). In other words, in step S74, the wireless communication apparatuses 10b and 10c transmit the data frame (wireless signal) of format which can be synthesized on the reception by the wireless communication apparatus 10 using the same frequency.

Note that a method of transmitting data frames from the wireless communication apparatuses 10b and 10c (whether to send data frames in a format to be orthogonal to each other or in a synthesizable format) is, for example, set to the second trigger frame transmitted from the wireless communication apparatus 10a in step S73. In this case, the method of transmitting the data frame may include indication of a retransmission method indicating that the retransmission of the target data is initiated by the wireless communication apparatuses 10b and 10c, the number of retransmissions of the target data, and intervals of retransmissions of the target data. Furthermore, the method of transmitting the data frame may also be set before the cooperative transmission is started (for example, in the time of establishing the communication link between the wireless communication apparatus 10a and the wireless communication apparatuses 10b and 10c or in the time of structuring the network system of FIG. 1).

When the process of step S74 is executed, the wireless communication apparatus 10d receives the data frames from the wireless communication apparatuses 10b and 10c. Note that, in this modification, since the data frames which can be synthesized on the reception are transmitted from the wireless communication apparatuses 10b and 10c, the wireless communication apparatus 10d receives the data frames transmitted from the wireless communication apparatuses 10b and 10c as a single data frame instead of separate data frames.

In this case, the wireless communication apparatus 10d transmits the BA frame including a reception result indicating whether or not the target data (first and second data) are received based on the received data frame to the wireless communication apparatuses 10b and 10c (step S75). Note that, as described above, the wireless communication apparatus 10d does not receive the data frames transmitted from the wireless communication apparatuses 10b and 10c (it is not possible to obtain reception results for each of the wireless communication apparatuses 10b and 10c), and thus, in this modification, the frame transmitted from the wireless communication apparatus 10d is a BA frame, not a MUBA frame.

When the process of step S75 is executed, the processes of steps S76 to S78 which are explained in the third modification of the second embodiment are executed. Note that, in step S76, as in step S74, data frames which can be synthesized on the reception by the wireless communication apparatus 10d using the same frequency are transmitted from the wireless communication apparatuses 10b and 10c.

As described above, in the present modification, for example, even in a structure where the wireless communication apparatus 10d cannot receive data frames (target data) from each of the wireless communication apparatuses 10b and 10c separately, smooth wireless communication can be achieved.

In at least one of the above mentioned embodiments, an electronic apparatus and a method which can achieve smooth wireless communication are provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus which is configured to communicate with a first wireless communication apparatus and a second wireless communication apparatus, the electronic apparatus comprising:
a transmitter configured to transmit (1) data and (2) a first wireless signal to instruct the first and second wireless communication apparatuses to transmit the data to a third wireless communication apparatus,
wherein:
the transmitter is further configured to transmit, in a case in which no second wireless signal transmitted from the first and second wireless communication apparatuses is detected within a first period after transmission of the data and the first wireless signal, a third wireless signal to instruct the first and second wireless communication apparatuses to retransmit the data to the third wireless communication apparatus,
each of the first and second wireless communication apparatuses is configured to communicate with the third communication apparatus and directly transmit the data to the third communication apparatus,
the first wireless signal comprises an indication of one of a first retransmission method and a second retransmission method, the first retransmission method being a method by which retransmission of the data is to be initiated by the electronic apparatus, and the second retransmission method being a method by which retransmission of the data is to be initiated by the first and second wireless communication apparatuses,
in a case in which the first wireless signal comprises the indication of the first retransmission method, the first period comprises a time from transmission of the first wireless signal to transmission of the second wireless signal by the first and second wireless communication apparatuses to the electronic apparatus, the second wireless signal being indicative of a reception result of the data in the third wireless communication apparatus, and
in a case in which the first wireless signal comprises the indication of the second retransmission method, the first period comprises a time from the transmission of the first wireless signal to one of (i) retransmission of the data by the first and second wireless communication apparatuses to the third wireless communication apparatus according to the reception result of the data in the third wireless communication apparatus and (ii) transmission of the second wireless signal by the first and second wireless communication apparatuses to the electronic apparatus.

2. The electronic apparatus of claim 1, wherein the third wireless signal comprises at least a part of the first wireless signal.

3. The electronic apparatus of claim 1, wherein a transmission time of the data determined based on a data length of the data is set in the first wireless signal, and the first period is determined based on the transmission time.

4. The electronic apparatus of claim 1, wherein, in the case in which the first wireless signal comprises the indication of the second retransmission method, the first wireless signal further comprises an indication of a number of retransmissions to be performed by the first and second wireless communication apparatuses and an interval between the retransmissions, and in response to receiving a reception result indicative of no reception of the data in the third wireless communication apparatus, the first and second wireless communication apparatuses retransmit the data to the third wireless communication apparatus based on the indication of the number of retransmissions and the interval.

5. The electronic apparatus of claim 1, wherein neither of the first and second wireless communication apparatuses transmits the second wireless signal in a case in which the reception result of the data in the third wireless communication apparatus is not received from the third wireless communication apparatus.

6. The electronic apparatus of claim 1, wherein each of the first and second wireless communication apparatuses transmits the second wireless signal comprising the reception result in response to receiving the reception result of the data in the third wireless communication apparatus from the third wireless communication apparatus.

7. The electronic apparatus of claim 6, wherein the third wireless communication apparatus transmits a first reception result indicative of whether or not the data are received from the first wireless communication apparatus and a second reception result indicative of whether or not the data are received from the second wireless communication apparatus, to the first and second wireless communication apparatuses.

8. The electronic apparatus of claim 6, wherein the third wireless communication apparatus transmits a third reception result in which a first reception result indicative of whether or not the data are received from the first wireless communication apparatus and a second reception result indicative of whether or not the data are received from the second wireless communication apparatus are synthesized, to the first and second wireless communication apparatuses.

9. The electronic apparatus of claim 7, wherein:
the data comprise first and second data,
in a case in which the first data are received in the third wireless communication apparatus, the second data are retransmitted to the third wireless communication apparatus, and in a case in which the second data are received in the third wireless communication apparatus, the first data are retransmitted to the third wireless communication apparatus.

10. The electronic apparatus of claim 1, wherein a transmission method of the data corresponding to performance of the third wireless communication apparatus is set such that, in a case in which data from a plurality of wireless communication apparatuses can be received separately by the third wireless communication apparatus, the transmission method of the data comprises a transmission method by which the first and second wireless communication apparatuses transmit data by wireless signals which are orthogonal to each other using a same frequency.

11. The electronic apparatus of claim 10, wherein the transmission method of the data is set in the first wireless signal.

12. The electronic apparatus of claim 10, wherein the transmission method of the data is set at a time of establishing a communication link between the electronic apparatus and the first and second wireless communication apparatuses.

13. The electronic apparatus of claim 12, wherein:
the transmission method of the data comprises at least one of a retransmission method, a number of retransmissions to be performed by the first and second wireless communication apparatuses, and an interval between the retransmissions, and
the retransmission method comprises one of the first retransmission method and the second retransmission method.

14. The electronic apparatus of claim 1, wherein a transmission method of the data corresponding to performance of the third wireless communication apparatus is set such that, in a case in which data from a plurality of wireless communication apparatuses cannot be received separately by the third wireless communication apparatus, the transmission method of the data comprises a transmission method by which each of the first and second wireless communication apparatuses transmits data which can be synthesized in reception by the third wireless communication apparatus using a same frequency.

15. The electronic apparatus of claim 1, wherein the electronic apparatus is communicatively connected to the first wireless communication apparatus and the second wireless communication apparatus in the first period after the transmission of the data and the first wireless signal.

16. The electronic apparatus of claim 1, wherein the communication between each of the first and second wireless communication apparatuses and the third wireless communication apparatus is performed without an intervention of the electronic apparatus.

17. The electronic apparatus of claim 1, wherein:
each of the electronic apparatus and the first and second wireless communication apparatuses is a wireless base station, and
the third wireless communication apparatus is a wireless terminal.

18. An electronic apparatus which is configured to communicate with a first wireless communication apparatus and a second wireless communication apparatus, the electronic apparatus comprising:
a receiver configured to receive (1) data, in a case in which the data is transmitted from the first wireless communication apparatus to the electronic apparatus and a third wireless communication apparatus different from the first and second wireless communication apparatuses, and (2) a first wireless signal which instructs the electronic apparatus and the third wireless communication apparatus to transmit the data to the second wireless communication apparatus, in a case in which the first wireless signal is transmitted from the first wireless communication apparatus to the electronic apparatus and the third wireless communication apparatus; and
a transmitter configured to directly transmit the data to the second wireless communication apparatus in a case in which the first wireless signal is received,
wherein:
the transmitter is further configured to transmit, in a case in which a reception result of the data in the second wireless communication apparatus is received, a second wireless signal comprising the reception result to the first wireless communication apparatus, and in a case in which the reception result of the data in the second wireless communication apparatus is not received, not to transmit the second wireless signal to the first wireless communication apparatus,
the third wireless communication apparatus is configured to communicate with the second wireless communication apparatus and directly transmit the data to the second communication apparatus,
the first wireless signal comprises an indication of one of a first retransmission method and a second retransmission method, the first retransmission method being a method by which retransmission of the data is to be initiated by the first apparatus, and the second retransmission method being a method by which retransmission of the data is to be initiated by the electronic apparatus and the third wireless communication apparatus,
in a case in which the first wireless signal comprises the indication of the first retransmission method, the first period comprises a time from transmission of the first wireless signal to transmission of the second wireless signal by the electronic apparatus and the third wireless communication apparatus to the first apparatus, and
in a case in which the first wireless signal comprises the indication of the second retransmission method, the first period comprises a time from the transmission of the first wireless signal to one of (i) retransmission of the data by the electronic apparatus and the third wireless communication apparatuses to the second wireless communication apparatus according to the reception result of the data in the second wireless communication apparatus and (ii) transmission of the second wireless signal by the electronic apparatus and the third wireless communication apparatus to the first apparatus.

19. A method to be executed by an electronic apparatus which communicates with a first wireless communication apparatus and a second wireless communication apparatus, the method comprising:
transmitting data;
transmitting a first wireless signal to instruct the first and second wireless communication apparatuses to transmit the data to the third wireless communication apparatus; and
in response to determining that no second wireless signal transmitted from the first and second wireless communication apparatuses is detected within a first period after transmission of the data and the first wireless signal, transmitting a third wireless signal to instruct the first and second wireless communication apparatuses to retransmit the data to the third wireless communication apparatus, wherein:

each of the first and second wireless communication apparatuses is configured to communicate with the third communication apparatus and directly transmit the data to the third communication apparatus, the first wireless signal comprises an indication of one of a first retransmission method and a second retransmission method, the first retransmission method being a method by which retransmission of the data is to be initiated by the electronic apparatus, and the second retransmission method being a method by which retransmission of the data is to be initiated by the first and second wireless communication apparatuses, in a case in which the first wireless signal comprises the indication of the first retransmission method, the first period comprises a time from transmission of the first wireless signal to transmission of the second wireless signal by the first and second wireless communication apparatuses to the electronic apparatus, the second wireless signal being indicative of a reception result of the data in the third wireless communication apparatus, and in a case in which the first wireless signal comprises the indication of the second retransmission method, the first period comprises a time from the transmission of the first wireless signal to one of (i) retransmission of the data by the first and second wireless communication apparatuses to the third wireless communication apparatus according to the reception result of the data in the third wireless communication apparatus and (ii) transmission of the second wireless signal by the first and second wireless communication apparatuses to the electronic apparatus.

20. A system comprising an electronic apparatus and first to third wireless communication apparatuses, the electronic apparatus being configured to communicate with each of the first and second wireless communication apparatuses, and the electronic apparatus comprising:

a transmitter configured to transmit (1) data and (2) a first wireless signal to instruct the first and second wireless communication apparatuses to transmit the data to a third wireless communication apparatus, wherein:

the transmitter is further configured to transmit, in a case in which no second wireless signal transmitted from the first and second wireless communication apparatuses is detected within a first period after transmission of the data and the first wireless signal, a third wireless signal to instruct the first and second wireless communication apparatuses to retransmit the data to the third wireless communication apparatus, each of the first and second wireless communication apparatuses is configured to communicate with the third communication apparatus and directly transmit the data to the third communication apparatus, the first wireless signal comprises an indication of one of a first retransmission method and a second retransmission method, the first retransmission method being a method by which retransmission of the data is to be initiated by the electronic apparatus, and the second retransmission method being a method by which retransmission of the data is to be initiated by the first and second wireless communication apparatuses, in a case in which the first wireless signal comprises the indication of the first retransmission method, the first period comprises a time from transmission of the first wireless signal to transmission of the second wireless signal by the first and second wireless communication apparatuses to the electronic apparatus, the second wireless signal being indicative of a reception result of the data in the third wireless communication apparatus, and in a case in which the first wireless signal comprises the indication of the second retransmission method, the first period comprises a time from the transmission of the first wireless signal to one of (i) retransmission of the data by the first and second wireless communication apparatuses to the third wireless communication apparatus according to the reception result of the data in the third wireless communication apparatus and (ii) transmission of the second wireless signal by the first and second wireless communication apparatuses to the electronic apparatus.

* * * * *